United States Patent
Huang et al.

(10) Patent No.: US 8,204,152 B2
(45) Date of Patent: Jun. 19, 2012

(54) DIGITALLY SYNCHRONIZED RECEIVING DEVICE AND ASSOCIATED SIGNAL PROCESSING METHOD

(75) Inventors: Fong-Ching Huang, Hsinchu (TW); Chih-Yung Shih, Taipei (TW)

(73) Assignee: Realtek Semiconductor Corp., Hsinchu (TW)

( * ) Notice: Subject to any disclaimer, the term of this patent is extended or adjusted under 35 U.S.C. 154(b) by 1050 days.

(21) Appl. No.: 12/107,761

(22) Filed: Apr. 22, 2008

(65) Prior Publication Data
US 2008/0267277 A1    Oct. 30, 2008

(30) Foreign Application Priority Data

Apr. 24, 2007 (TW) ................................ 96114346 A

(51) Int. Cl.
*H04L 27/00* (2006.01)
(52) U.S. Cl. ....................................................... 375/316
(58) Field of Classification Search .................. 375/142, 375/143, 144, 148, 150, 152, 232, 234, 316, 375/343, 346; 455/63.1, 114.2, 278.1, 296
See application file for complete search history.

(56) References Cited

U.S. PATENT DOCUMENTS

| | | | |
|---|---|---|---|
| 6,229,859 B1 | 5/2001 | Jeong et al. | |
| 6,587,525 B2 | 7/2003 | Jeong et al. | |
| 6,937,646 B1 | 8/2005 | McCorkle | |
| 7,095,789 B2 | 8/2006 | Ware et al. | |
| 7,693,240 B2 * | 4/2010 | Mezer et al. | 375/346 |
| 2003/0198308 A1 | 10/2003 | Hoctor et al. | |
| 2005/0034009 A1 * | 2/2005 | Sutardja et al. | 713/503 |
| 2009/0067451 A1 * | 3/2009 | Cotton et al. | 370/492 |

* cited by examiner

*Primary Examiner* — Sam K Ahn
(74) *Attorney, Agent, or Firm* — Thomas, Kayden, Horstemeyer & Risley, LLP

(57) ABSTRACT

A digitally synchronized receiving device and an associated signal processing method are provided. The digitally synchronized receiving device can receive data transmitted by a transmitter. The transmitter and the receiving device belong to a first clock domain and a second clock domain respectively. The receiving device performs synchronization in a digital manner, so as to deal with the problem of the analog solution in prior arts and the synchronization for interference cancellation.

19 Claims, 19 Drawing Sheets

DIGITALLY SYNCHRONIZED RECEIVING DEVICE AND ASSOCIATED SIGNAL PROCESSING METHOD

BACKGROUND OF THE INVENTION (a). Field of the Invention

The invention relates to communication systems, and more particularly to a receiver architecture for the communication system.

(b). Description of the Prior Arts

In a communication system, the receiver and the transmitter may operate in different clock frequencies, that is, the receiver and the transmitter may belong to different clock domains. Thus, the communication system needs a synchronization mechanism to adjust the clock phase and frequency to let the receiver and the transmitter be synchronous, thereby transceiving data correctly.

In prior arts, the synchronization solution is analog-based. That is, the receiver estimates a timing error of a received signal resulted from different clock phase and frequency between the local receiver and the far-end transmitter, and then feedbacks the estimated timing error to the clock source (e.g. an oscillator) of the receiver, so as to directly adjust the phase and frequency of the clock source to be synchronous as that of the transmitter and thus achieve the synchronization. However, this analog-based solution has disadvantages. That is, the direct adjustment of the phase and frequency of the clock source will introduce more clock jitter. Considering a longer time period, the clock phase and frequency of the receiver may have small error in comparison with the transmitter, and each respective clock is likely to have jitter. This will cause signal sampling errors and consequently results in errors in data reception.

Besides, since the receiver receives data and interference simultaneously, the synchronization problem also exists when the interference cancellation is performed. For example, in a full duplex communication system, since the transmission and reception of signals are performed simultaneously in the same channel, the received signal of a receiver at one side of the channel includes both the signal transmitted by a transmitter at the other side and the echo resulted from the signal transmitted by a transmitter at the same side as the receiver. Further, in a multi-channel communication system, the received signal of a receiver at one side of a channel includes both the signal transmitted by a transmitter at the other side of the same channel and the cross talk resulted from the signal transmitted by transmitters in other channels. In order to cancel the echo or cross talk, an echo canceller or cross talk canceller is used to simulate and generate the echo or cross talk signal, and then the simulated echo or cross talk signal is used to cancel the true interference in the received signal of the receiver. However, since these cancellers perform the simulation according to the data transmitted by a certain transmitter which may belong to a clock domain different from the receiver, the simulated echo or cross talk may also belong to a clock domain different from the received signal of the receiver. Thus, it is necessary to perform synchronization before canceling the echo and cross talk.

SUMMARY OF THE INVENTION

It is therefore one objective of the invention to provide a receiving device and an associated signal processing method which can perform synchronization in digital domain so as to avoid the problem brought by the analog-based solution of the prior arts.

Another objective of the invention is to provide a receiving device and an associated signal processing method to solve the synchronization problem of interference cancellation (ex. Echo, near-end/far-end cross-talk).

In one embodiment of the invention, a receiving device is provided. The receiving device operates in a second clock domain and receives data transmitted by a first transmitter operating in a first clock domain. The receiving device comprises: a cancellation signal generator for generating a digital cancellation signal according to a digital transmitted signal corresponding to data transmitted by a second transmitter, wherein the digital cancellation signal corresponds to an interference signal within a digital received signal of the receiving device, wherein the digital received signal belongs to the second clock domain and corresponds to the data transmitted by the first transmitter, and the interference signal corresponds to the digital transmitted signal; and an equalizing and canceling circuit, coupled to the cancellation signal generator, for performing a clock domain conversion, a channel equalization, and a digital interference cancellation on the digital received signal according to the digital cancellation signal.

In another embodiment of the invention, a signal processing method used in a receiver is provided. The receiver belongs to a second clock domain and receives data transmitted by a first transmitter belonging to a first clock domain. The method comprises: receiving a digital received signal, wherein the digital received signal belongs to the second clock domain and corresponds to the data transmitted by the first transmitter; generating a digital cancellation signal according to a digital transmitted signal corresponding to data transmitted by a second transmitter, wherein the digital cancellation signal corresponds to an interference signal within the digital received signal, wherein the interference signal corresponds to the digital transmitted signal; performing a clock domain conversion to convert the digital received signal to the first clock domain; performing a channel equalization on the digital received signal; and performing a digital interference cancellation on the digital received signal according to the digital cancellation signal.

DETAILED DESCRIPTION OF THE INVENTION

Figure 1:
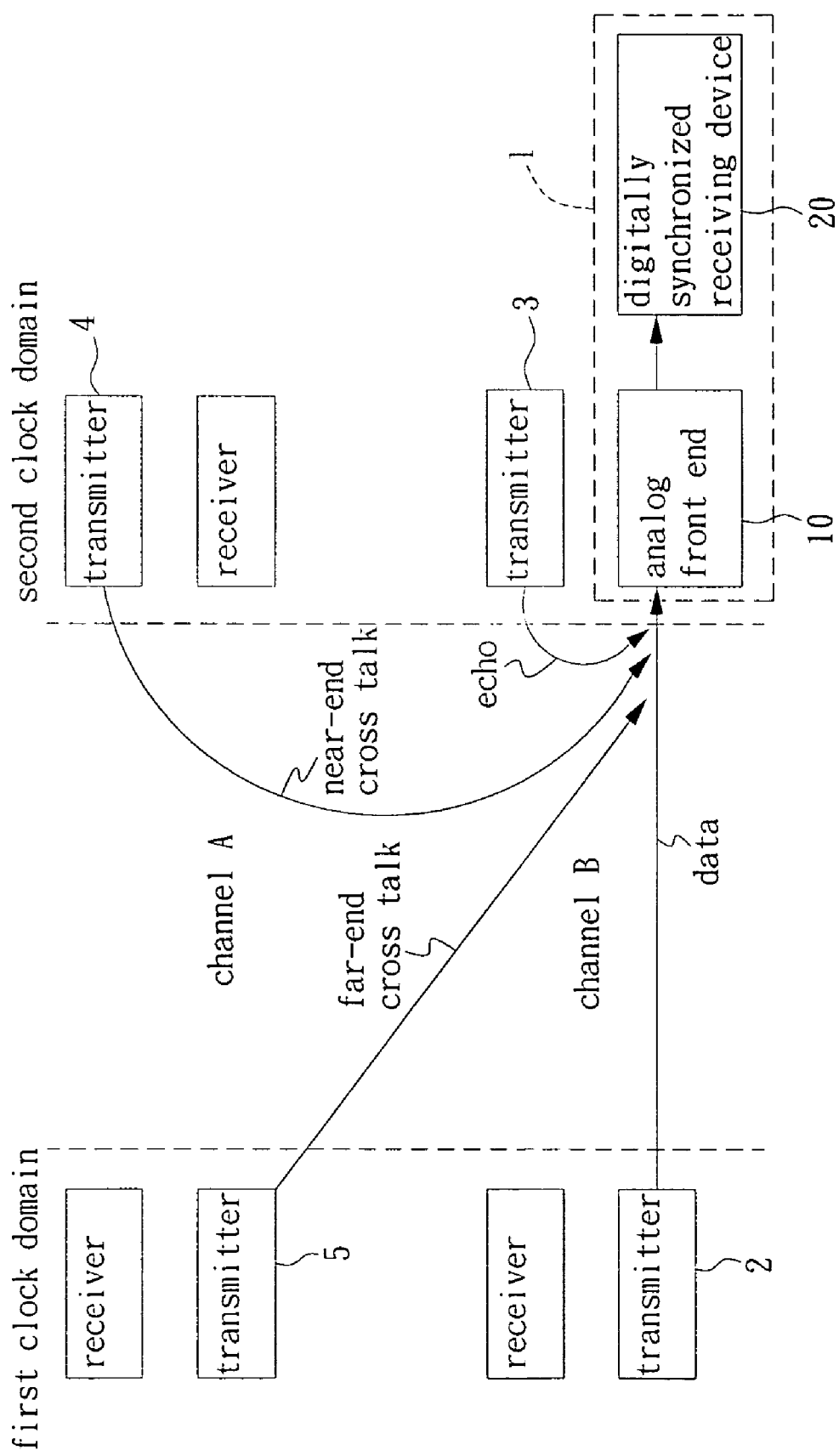
FIG. 1 is a diagram showing a multi-channel full duplex communication system according to an embodiment of the invention.

FIG. 1 is a diagram showing a multi-channel full duplex communication system according to an embodiment of the invention. As shown, the multi-channel full duplex communication system has a channel A and a channel B (here two channels are taken as example for the sake of simplicity), and two sides of each channel belongs to a first clock domain and a second clock domain respectively. A digitally synchronized receiving device 20 with a function of interference cancellation is integrated into a receiver 1 of the channel B. The receiver 1 further includes an analog front end 10 for receiving data transmitted via the channel B by a transmitter 2. The analog front end 10 further receives various interferences which include the echo resulted from the data transmitted by a transmitter 3 of the channel B, the near-end cross talk resulted from the data transmitted by a transmitter 4 of the channel A, and the far-end cross talk resulted from the data transmitted by a transmitter 5 of the channel A. The analog front end 10 converts the analog received signal (including various interferences) into a digital received signal, which is then sent to the digitally synchronized receiving device 20 for subsequent processing.

Figure 2:
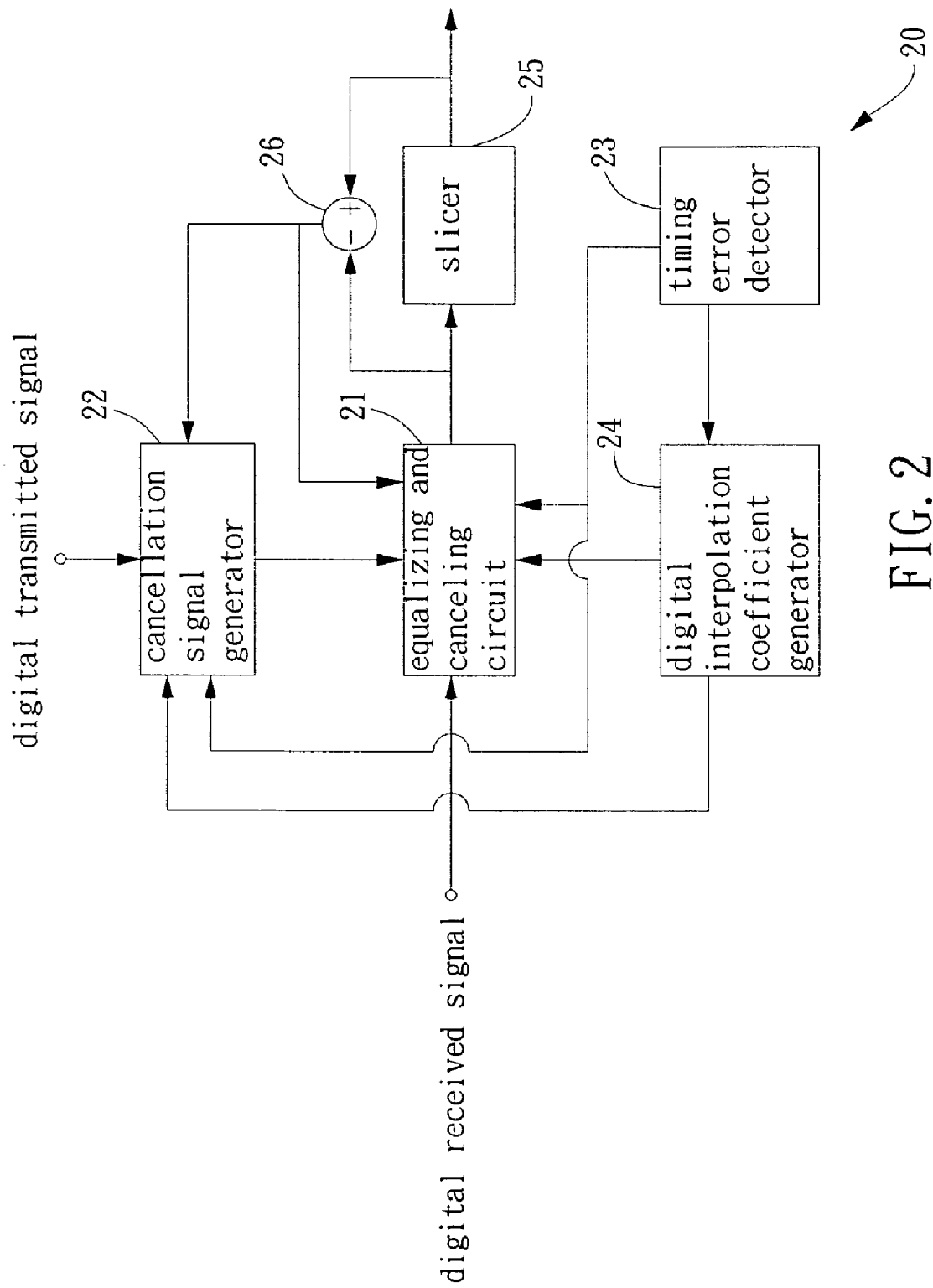
FIG. 2 is a block diagram of a preferred embodiment of the digitally synchronized receiving device of FIG. 1 according to the invention.

FIG. 2 is a block diagram of a preferred embodiment of the digitally synchronized receiving device 20 of FIG. 1 according to the invention. In this preferred embodiment, the digitally synchronized receiving device 20 includes an equalizing and canceling circuit 21 and a cancellation signal generator 22. The equalizing and canceling circuit 21 receives the digital received signal outputted by the analog front-end 10, and performs a clock domain conversion in digital domain to convert the digital received signal from the second clock domain to the first clock domain. The equalizing and canceling circuit 21 further performs a channel equalization to remove the channel response generated during the data transmission in the channel B. According to a digital transmitted signal, the cancellation signal generator 22 generates a digital cancellation signal to the equalizing and canceling circuit 21 so as to perform an interference cancellation. The digital transmitted signal includes the data transmitted by the transmitter 3, 4, or 5 in FIG. 1, and the digital cancellation signal is used for canceling an interference signal within the digital received signal, where the interference signal corresponds to the digital transmitted signal. For example, if the interference signal includes the echo (i.e. the digital transmitted signal includes the data transmitted by the transmitter 3), then the digital cancellation signal generated by the cancellation signal generator 22 will include cancellation signal for canceling echo; if the interference signal includes the near-end cross talk (i.e. the digital transmitted signal includes the data transmitted by the transmitter 4), then the digital cancellation signal will include the cancellation signal for canceling near-end cross talk; if the interference signal includes the far-end cross talk (i.e. the digital transmitted signal includes the data transmitted by the transmitter 5), then the digital cancellation signal will include the cancellation signal for canceling far-end cross talk.

The equalizing and canceling circuit 21 performs a digital interference cancellation on the digital received signal according to the digital cancellation signal. In an embodiment, the digital interference cancellation is performed by subtracting the digital cancellation signal from the digital received signal. In order that the digital interference cancellation can be correctly performed, the digital received signal and the digital cancellation signal must belong to the same clock domain. Thus, based on which clock domain the digital transmitted signal originally belongs to and the clock domain when the equalizing and canceling circuit 21 performs the digital interference cancellation (i.e. before or after performing the second-to-first clock domain conversion on the digital received signal), the cancellation signal generator 22 can generate the digital cancellation signal belonging to the same clock domain as the digital received signal. There are three cases as follows:

(1) If the digital transmitted signal belongs to the second clock domain (e.g. the digital transmitted signal is transmitted by the transmitter 3 or 4) and if the equalizing and canceling circuit 21 performs the digital interference cancellation after performing the second-to-first clock domain conversion on the digital received signal, since the digital received signal has already been converted to the first clock domain, the cancellation signal generator 22 will also perform a second-to-first clock domain conversion to make the digital cancellation signal belong to the first clock domain. Then, both the digital received signal and the digital cancellation signal will belong to the first clock domain, and the equalizing and canceling circuit 21 can thus perform the digital interference cancellation correctly.

(2) If the digital transmitted signal belongs to the second clock domain and if the equalizing and canceling circuit 21 performs the digital interference cancellation before performing the second-to-first clock domain conversion on the digital received signal, since the digital received signal still belongs to the second clock domain, the cancellation signal generator 22 will generate the digital cancellation signal belonging to the second clock domain directly according to the digital transmitted signal.

(3) If the digital transmitted signal belongs to the first clock domain (e.g. the digital transmitted signal is transmitted by the transmitter 5) and if the equalizing and canceling circuit 21 performs the digital interference cancellation after performing the second-to-first clock domain conversion on the digital received signal, since the digital received signal has already been converted to the first clock domain, the cancellation signal generator 22 needn't perform a clock domain conversion and will directly generate the digital cancellation signal belonging to the first clock domain according to the digital transmitted signal.

The digitally synchronized receiving device 20 further includes a timing error detector 23 for detecting a timing error between the first clock domain and the second clock domain. The timing error, resulted from the different clock speeds of the first and second clock domains, can indicate that the signal of the second clock domain currently leads or lags the signal of the first clock domain by n sampling intervals, where n is divided into an integer part and a fractional part. The timing error detector 23 estimates the integer part of the timing error, then passing to the equalizing and canceling circuit 21 and the cancellation signal generator 22 respectively, both of which can achieve the effect of advancing or delaying an integer number of sampling intervals in various ways (e.g. adjusting the filter delay tabs) so as to compensate the integer part of the timing error when performing a second-to-first or first-to-second clock domain conversion. The technology about how to advance or delay an integer number of sampling intervals is well known to people skilled in the art and will not be described here.

On the other hand, the timing error detector 23 estimates the fractional part of the timing error then passing to a digital interpolation coefficient generator 24 for generating a plurality of first and second digital interpolation coefficients used in a first and a second digital interpolation operation respectively. The first and second digital interpolation operations can interpolate the new sampling values according to a specific sampling value. The first digital interpolation operation is used to compensate the fractional part of the timing error resulted from the second-to-first clock domain conversion, and the second digital interpolation operation is used to compensate the fractional part of the timing error resulted from the first-to-second clock domain conversion. The digital interpolation coefficient generator 24 calculates the first and second digital interpolation coefficients then passing to the equalizing and canceling circuit 21 and the cancellation signal generator 22, both of which can thus perform the first and second digital interpolation operations. The digital interpolation coefficient generator 24 can perform various algorithms to generate the digital interpolation coefficients. In one embodiment, the digital interpolation coefficient generator 24 performs Lagrange interpolation algorithm to generate the first and second digital interpolation coefficients. In another embodiment, the digital interpolation coefficient generator 24 includes a lookup table preloaded with the first and second digital interpolation coefficients corresponding to different fractional parts of the timing error. In this manner, the required digital interpolation coefficients can be rapidly obtained by searching the lookup table, and executing suitable coefficients interpolation according to a specific fractional timing error.

By compensating the integer part and the fractional part of the timing error in digital domain as described above, the equalizing and canceling circuit 21 and the cancellation signal generator 22 can perform the second-to-first or first-to-second clock domain conversion to achieve the synchronization.

The digitally synchronized receiving device 20 further includes a slicer 25 and an adder 26. The slicer 25 is coupled to the equalizing and canceling circuit 21, and slices the digital received signal processed by the equalizing and canceling circuit 21 (i.e. the channel equalization and interference cancellation) into a sequence of level values. Then, the adder 26 can calculate the difference between the sequence of level values and the before-slicing values of the digital received signal processed by the equalizing and canceling circuit 21 to generate an error signal. Then, the error signal is fed back to the equalizing and canceling circuit 21 and the cancellation signal generator 22 for performing the equalizer and canceller coefficients adaptation so as to obtain more accurate channel equalization and digital interference cancellation signal.

The first to eighth embodiments shown in FIG. 3 to FIG. 10 are eight different implementations of the digitally synchronized receiving device 20 of FIG. 2. In the first to eighth embodiments, the equalizing and canceling circuit 21 and the cancellation signal generator 22 use digital interpolators to perform digital interpolation operation, so as to compensate the fractional part of the timing error when performing the second-to-first or first-to-second clock domain conversion. Besides, the equalizing and canceling circuit 21 and the cancellation signal generator 22 also use the digital delay elements to compensate the integer part of the timing error when performing the second-to-first or first-to-second clock domain conversion. Thus, in the first to eighth embodiments, the digital interpolators can compensate the integer and fractional parts of the timing error simultaneously to complete the second-to-first or first-to-second clock domain conversion. However, it is notable that the integer part of the timing error can also be compensated by other components (e.g. equalizer or canceller) within the equalizing and canceling circuit 21 and the cancellation signal generator 22 instead of the digital interpolator.

Figure 3:
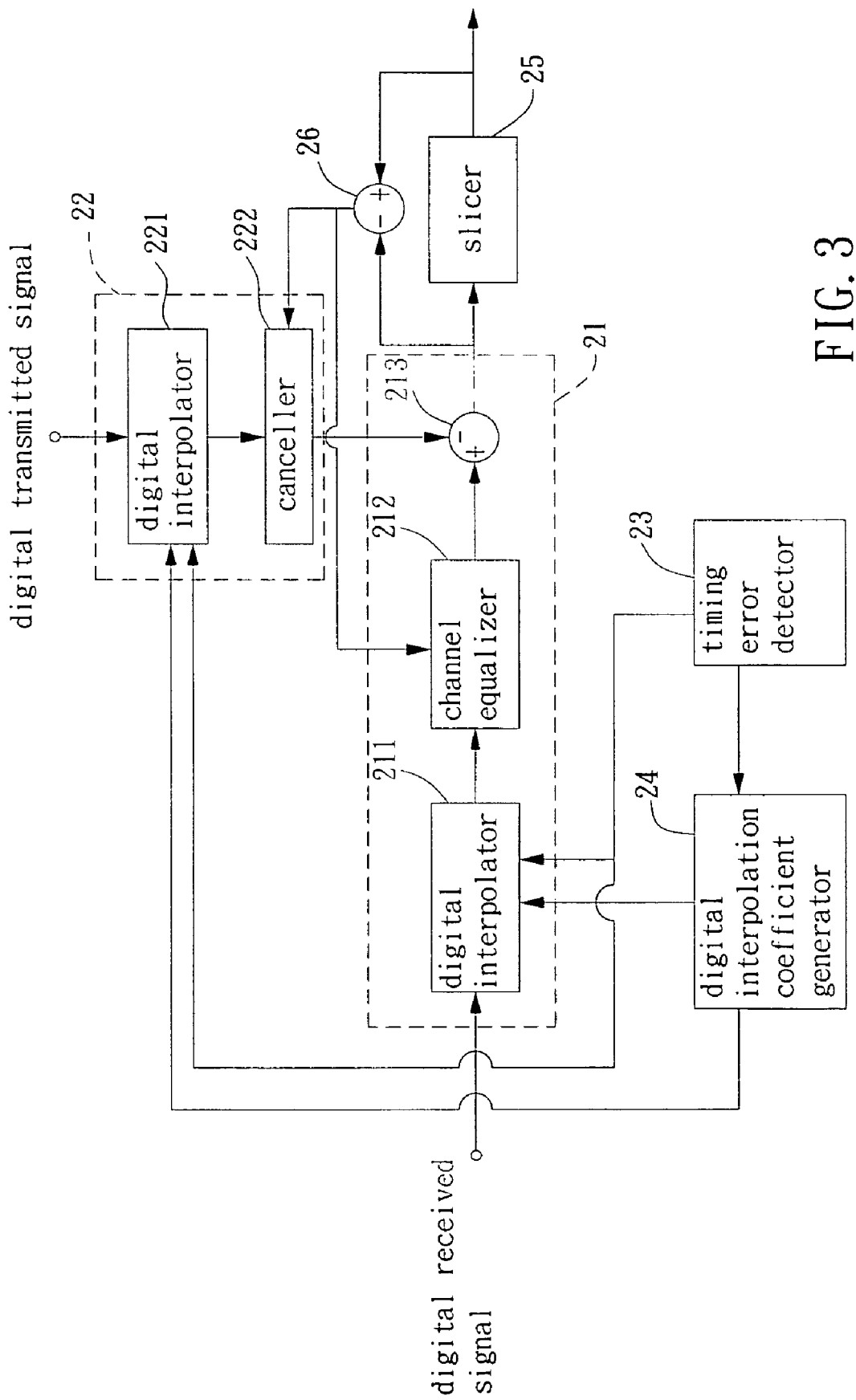
FIG. 3 is a block diagram of the first embodiment of the digitally synchronized receiving device of the invention.

In the first embodiment of FIG. 3, the digital transmitted signal belongs to the second clock domain, and the cancellation signal generator 22 includes a digital interpolator 221 and a canceller 222. The digital interpolator 221 performs the first digital interpolation operation on the digital transmitted signal according to the digital interpolation coefficients generated by the digital interpolation coefficient generator 24, such that the digital transmitted signal is converted to the first clock domain. The canceller 222 is coupled to the digital interpolator 221 and the adder 26, and generates the digital cancellation signal according to the converted digital transmitted signal and the error signal, wherein the canceller 222 itself is a filter and can perform the adaptation according to the error signal so as to generate a more accurate digital cancellation signal. On the other hand, the equalizing and canceling circuit 21 includes a digital interpolator 211, a channel equalizer 212 and an adder 213. The digital interpolator 211 is coupled to the digital interpolation coefficient generator 24, and performs the first digital interpolation operation on the digital received signal according to the first digital interpolation coefficients, such that the digital received signal is converted from the second clock domain to the first clock domain. The channel equalizer 212 is coupled to the adder 26 and the digital interpolator 211, and performs the channel equalization on the converted digital received signal. The channel equalizer 212 can also perform the adaptation according to the error signal. The adder 213 is coupled to the channel equalizer 212 and the canceller 222, and subtracts the digital cancellation signal from the channel-equalized digital received signal so as to cancel the interference.

Figure 4:
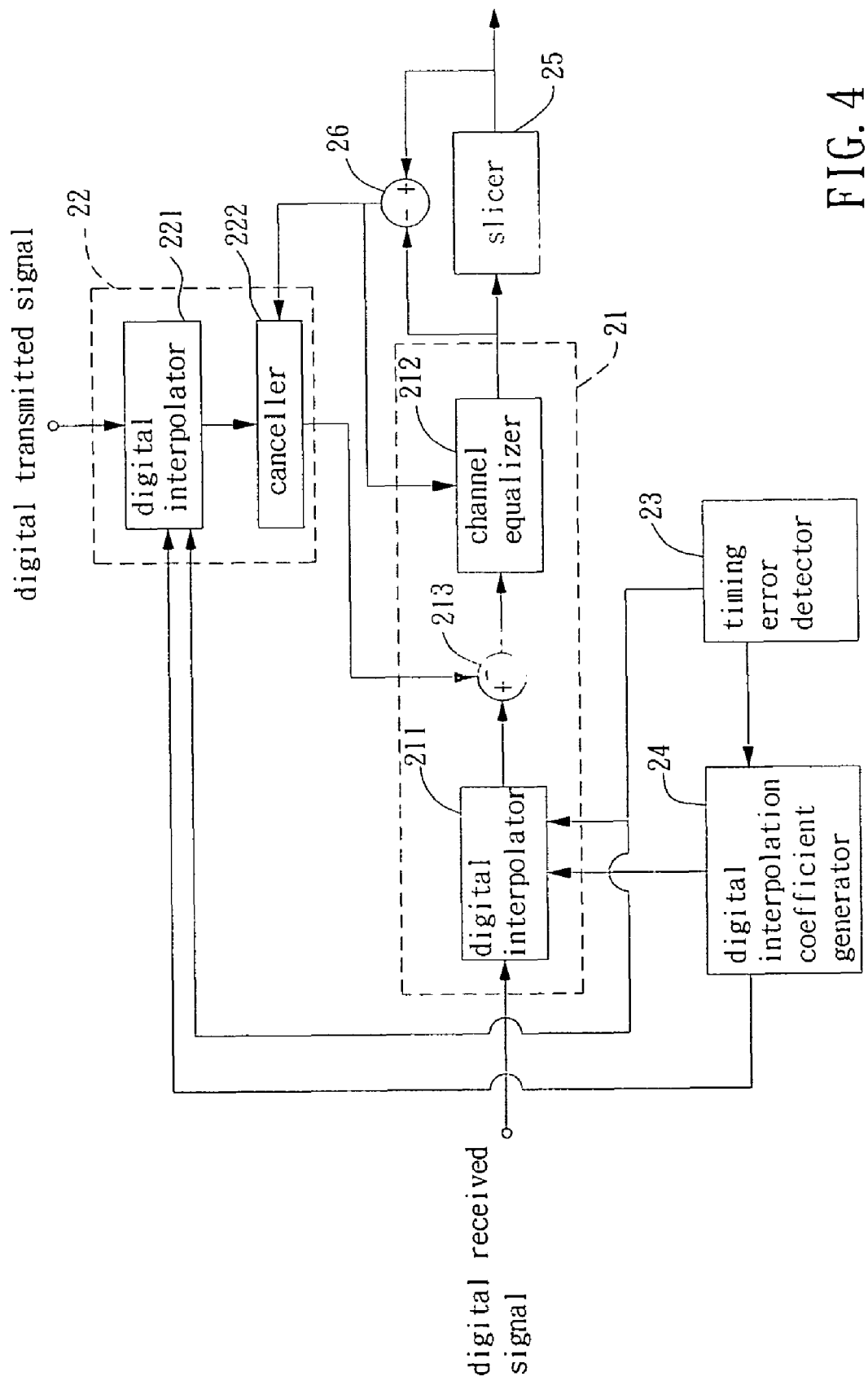
FIG. 4 is a block diagram of the second embodiment of the digitally synchronized receiving device of the invention.

In the second embodiment of FIG. 4, please notice the order of the channel equalizer 212 and the adder 213 in the equalizing and canceling circuit 21. As shown in FIG. 4, the adder 213 lies before the channel equalizer 212, that is, the digital interference cancellation is performed before the channel equalization.

Figure 5:
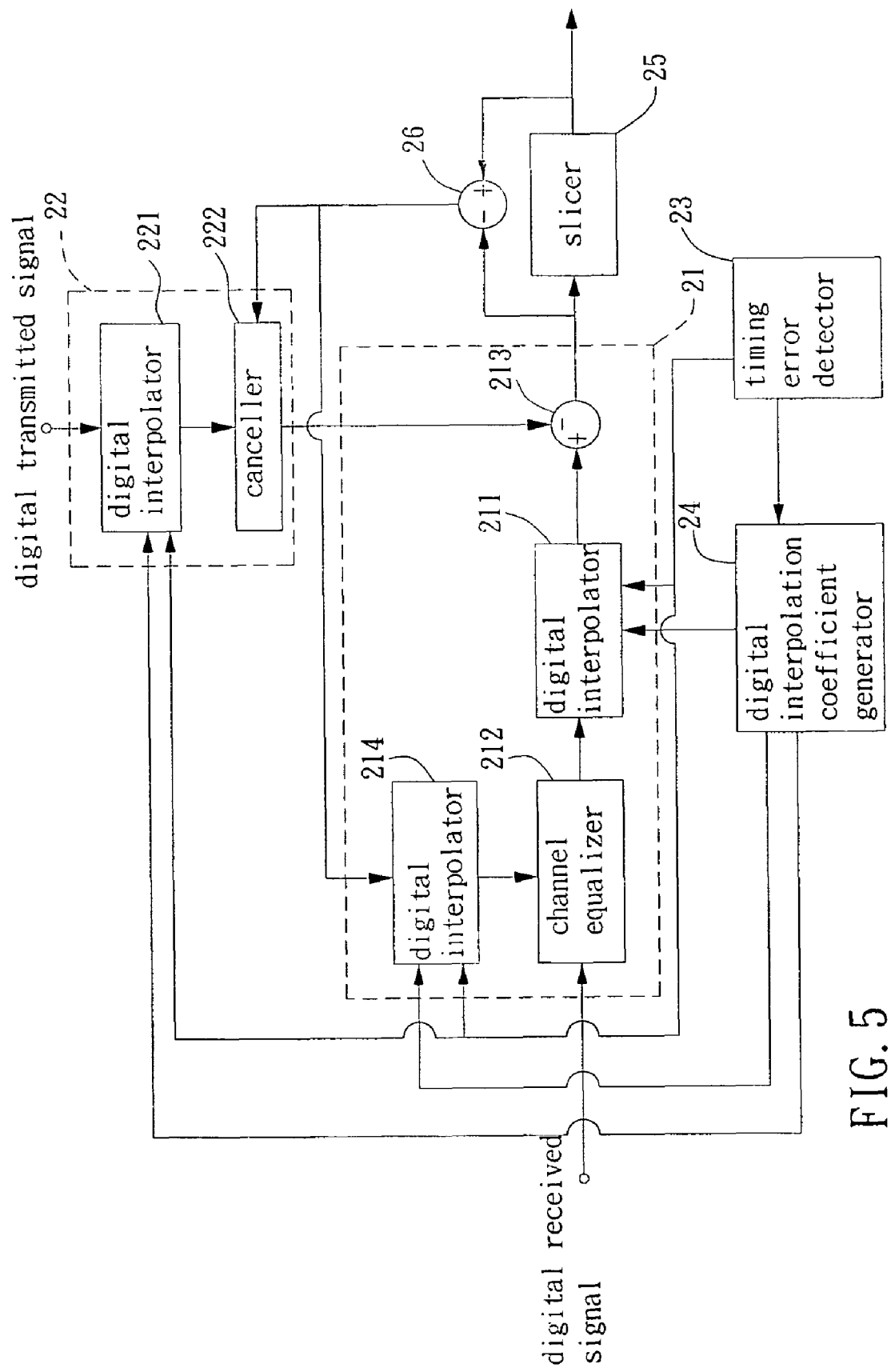
FIG. 5 is a block diagram of the third embodiment of the digitally synchronized receiving device of the invention.
Figure 6:
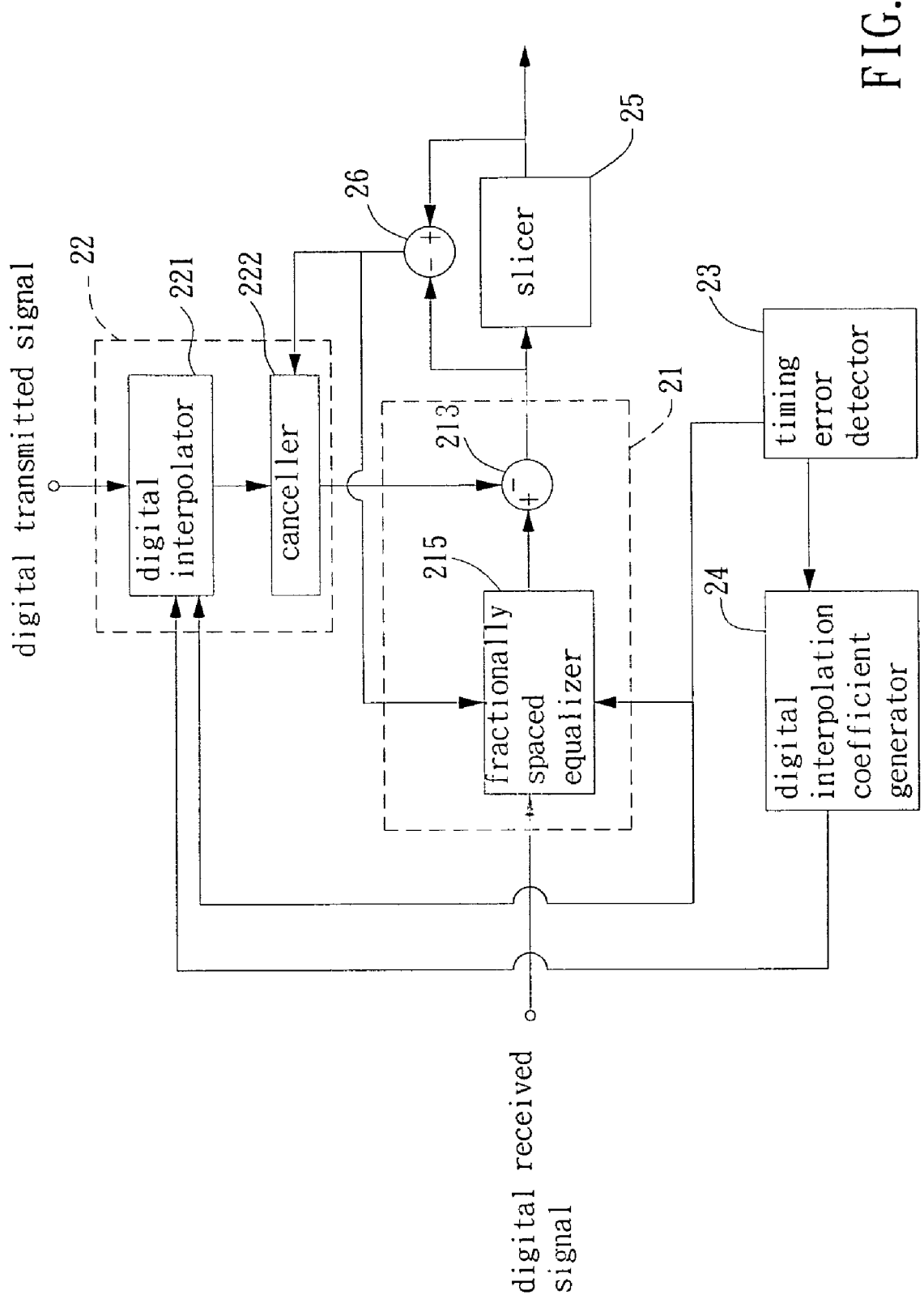
FIG. 6 is a block diagram of the fourth embodiment of the digitally synchronized receiving device of the invention.

In the third embodiment of FIG. 5 and the fourth embodiment of FIG. 6, please notice the implementation of the equalizing and canceling circuit 21. In FIG. 5, the channel equalizer 212 lies before the digital interpolator 211 such that the channel equalization can be performed before the digital received signal is converted to the first clock domain. Thus, before being provided to the channel equalizer 212, the error signal originally belonging to the first clock domain needs to pass through a digital interpolator 214 which can perform the second digital interpolation operation to convert the error signal from the first clock domain to the second clock domain. The digital interpolator 214 performs the second digital interpolation operation according to the second digital interpolation coefficients generated by the digital interpolation coefficient generator 24. After being performed the channel equalization, the digital received signal is provided to the digital interpolator 211 for performing the second-to-first clock domain conversion. Then, the converted digital received signal is provided to the adder 213 for subtracting the digital cancellation signal.

In FIG. 6, the equalizing and canceling circuit 21 simultaneously performs the second-to-first clock domain conversion and channel equalization on the digital received signal by means of a fractionally spaced equalizer 215. Then, the digital received signal already processed by the fractionally spaced equalizer 215 is sent to the adder 213 for subtracting the digital cancellation signal. The fractionally spaced equalizer 215 is also coupled to the adder 26 to receive the error signal, and performs the adaptation according to the error signal. The principle and operation of the fractionally spaced equalizer 215 is well known to people skilled in the art and will not be described here.

In the first, third and fourth embodiments mentioned above, if the digital transmitted signal belongs to the first clock domain rather than the second clock domain, then the cancellation signal generator 22 needn't perform the clock domain conversion (and thus the digital interpolator 221 is not needed). The canceller 222 will directly generate the digital cancellation signal according to the digital transmitted signal and the error signal.

Figure 7:
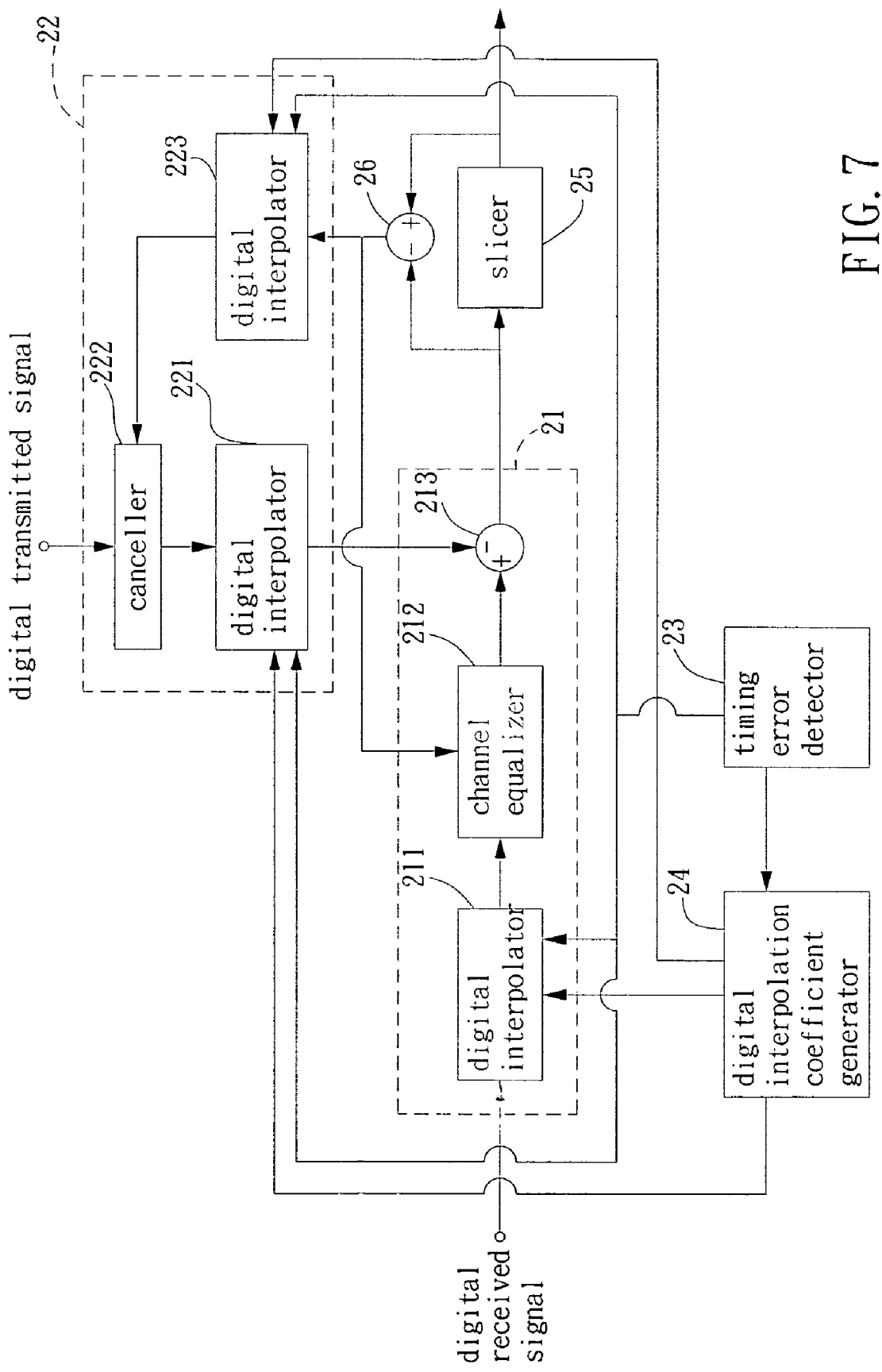
FIG. 7 is a block diagram of the fifth embodiment of the digitally synchronized receiving device of the invention.

In the fifth embodiment of FIG. 7, please notice the implementation of the cancellation signal generator 22. In FIG. 7, the canceller 222 lies before the digital interpolator 211 such that the digital cancellation signal is first generated according to the digital transmitted signal and then sent to the digital interpolator 221 to being converted to the first clock domain. Thus, before being provided to the canceller 222 for adaptation, the error signal originally belonging to the first clock domain needs to pass through a digital interpolator 223, which is coupled to the digital interpolation coefficient generator 24 and performs the second digital interpolation operation to convert the error signal to the second clock domain.

Figure 8:
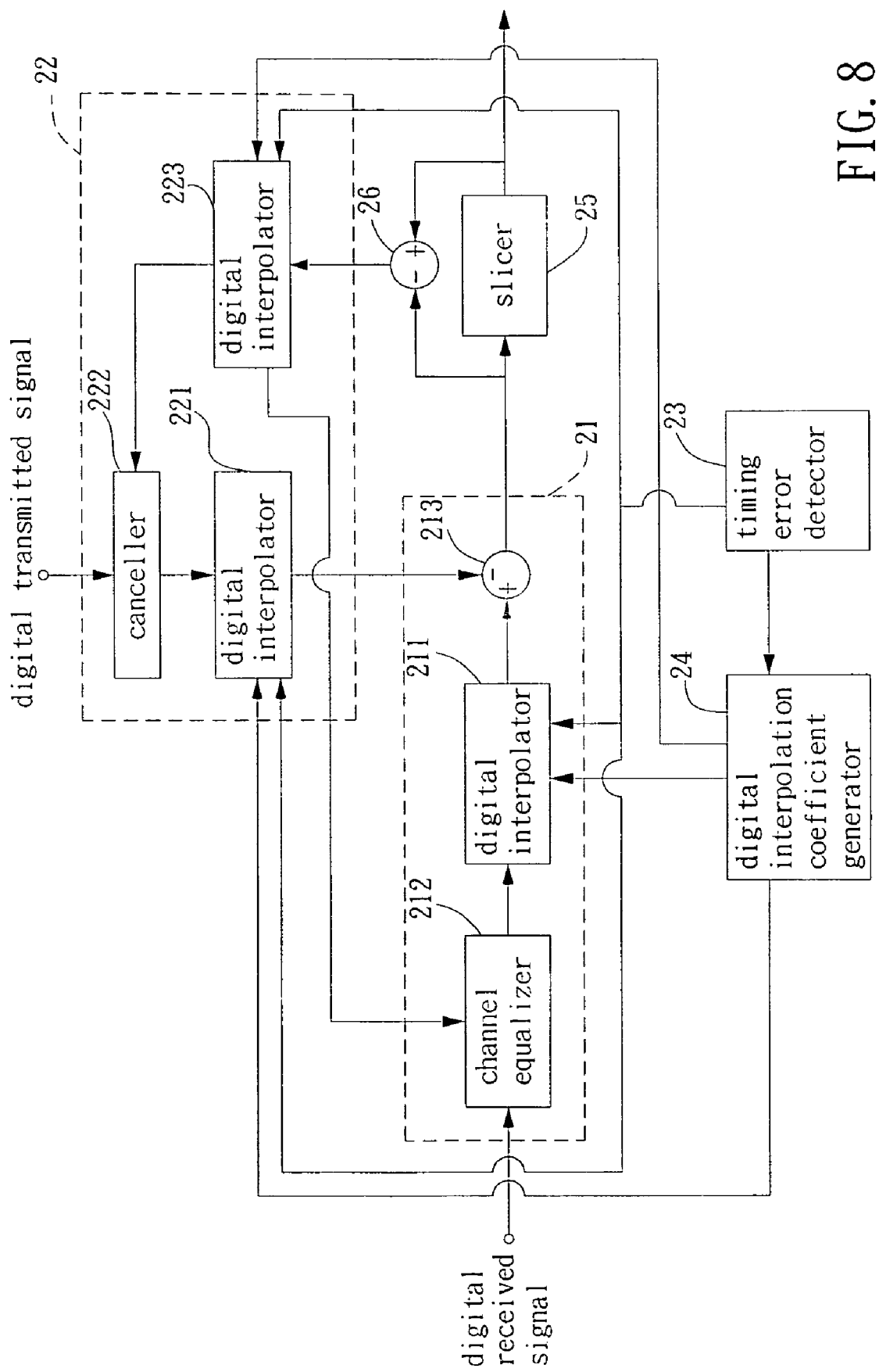
FIG. 8 is a block diagram of the sixth embodiment of the digitally synchronized receiving device of the invention.
Figure 9:
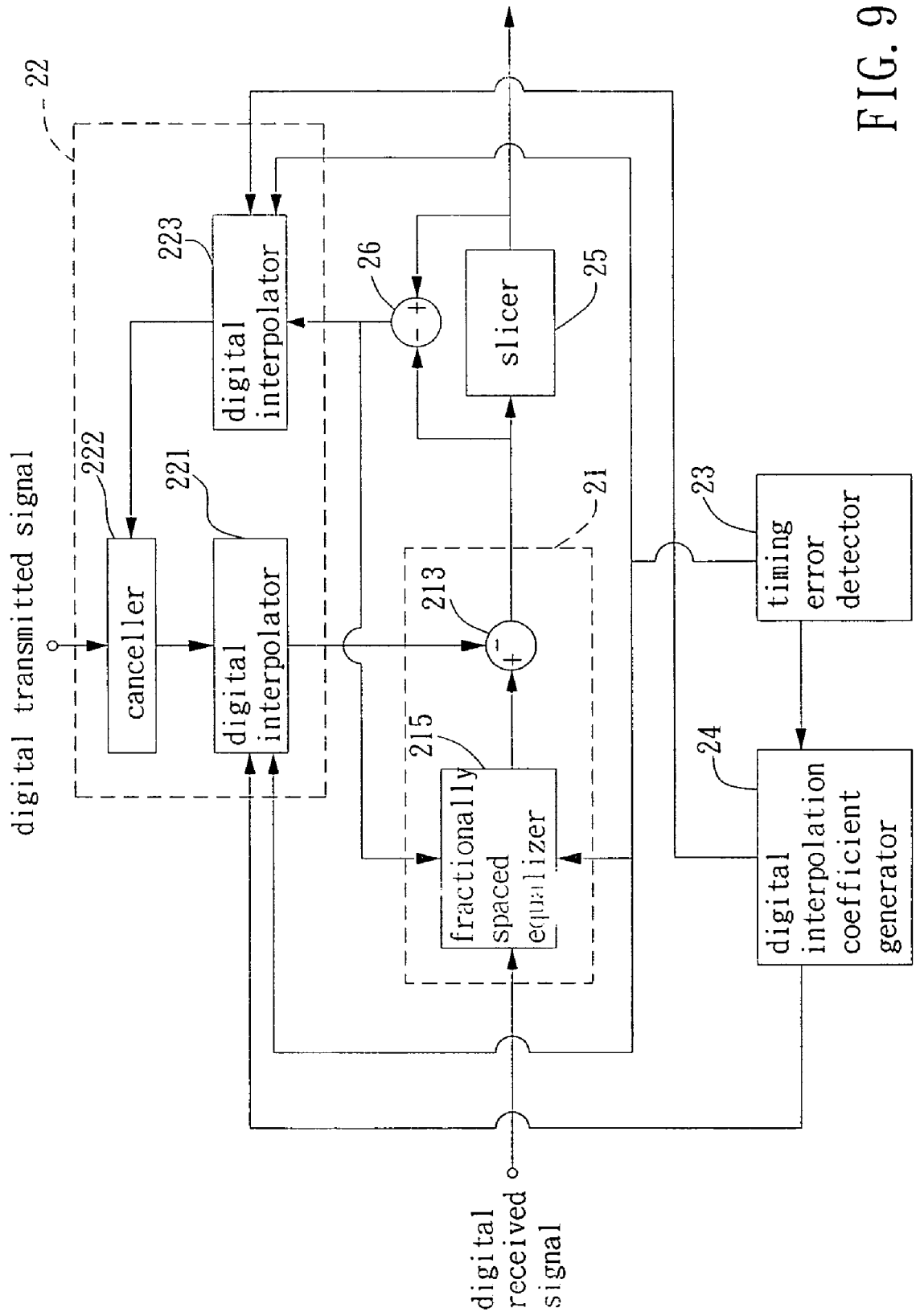
FIG. 9 is a block diagram of the seventh embodiment of the digitally synchronized receiving device of the invention.

In the sixth embodiment of FIG. 8 and the seventh embodiment of FIG. 9, please notice the implementation of the equalizing and canceling circuit 21. In FIG. 8, the channel equalizer 212 lies before the digital interpolator 211 such that the channel equalization can be performed before the digital received signal is converted to the first clock domain. Thus, before being provided to the channel equalizer 212, the error signal originally belonging to the first clock domain needs to pass through a digital interpolator 223 which can perform the second digital interpolation operation to convert the error signal to the second clock domain. After being performed the channel equalization, the digital received signal is provided to the digital interpolator 211 for performing the second-to-first clock domain conversion. Then, the converted digital received signal is provided to the adder 213 for subtracting the digital cancellation signal.

In FIG. 9, the equalizing and canceling circuit 21 simultaneously performs the second-to-first clock domain conversion and channel equalization on the digital received signal by means of the fractionally spaced equalizer 215. Then, the digital received signal already processed by the fractionally spaced equalizer 215 is sent to the adder 213 for subtracting the digital cancellation signal. The fractionally spaced equalizer 215 is also coupled to the adder 26 to receive the error signal, and performs the adaptation according to the error signal.

Figure 10:
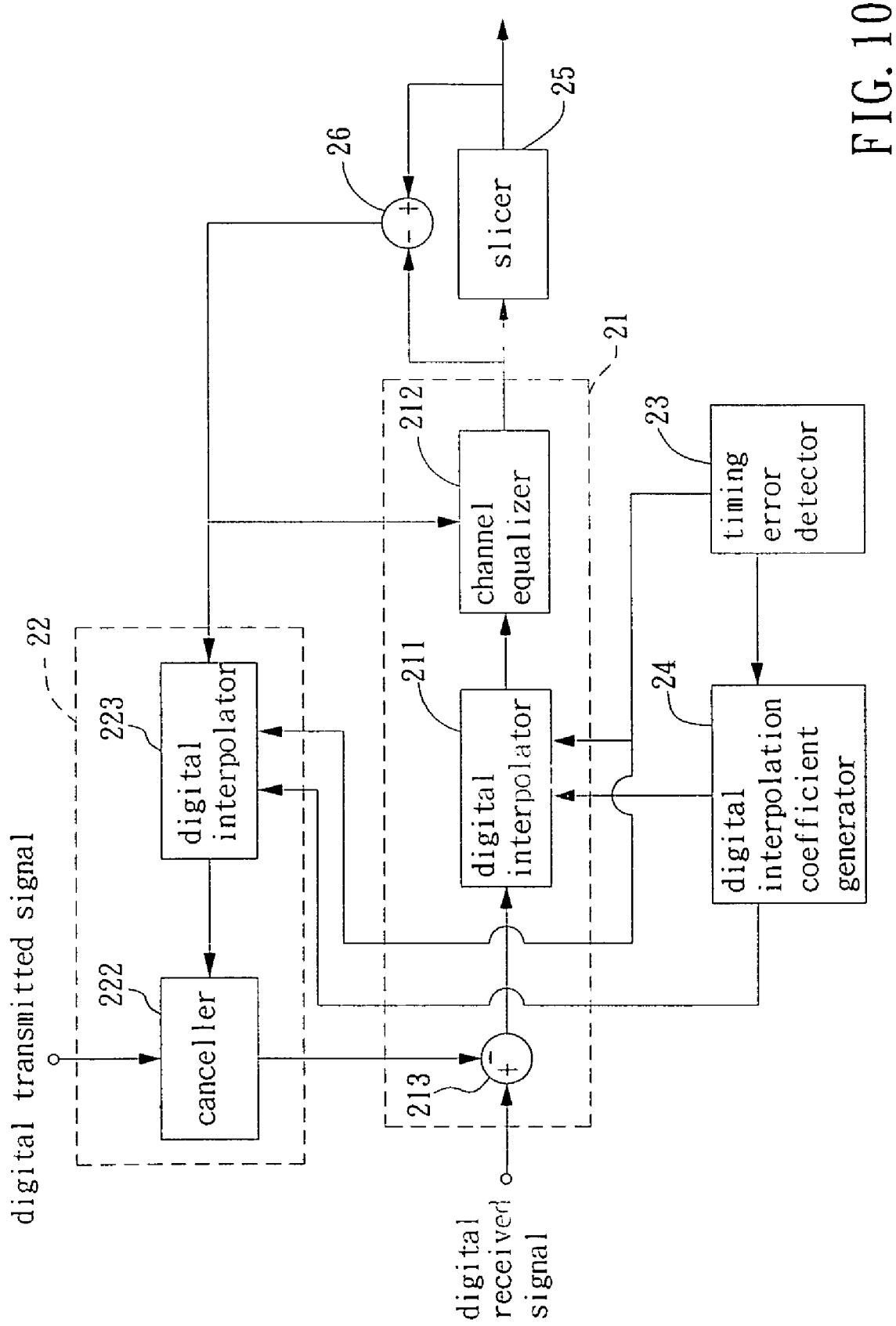
FIG. 10 is a block diagram of the eighth embodiment of the digitally synchronized receiving device of the invention.

In the eighth embodiment of FIG. 10, the digital transmitted signal belongs to the second clock domain, and the equalizing and canceling circuit 21 performs the digital interference cancellation by the adder 213 and then performs the second-to-first clock domain conversion and the channel equalization in sequence by the digital interpolator 211 and the channel equalizer 212. Thus, the cancellation signal generator 22 can generate the digital cancellation signal belonging to the first clock domain by directly using the canceller 222, without need of the digital interpolator 221 to perform the first digital interpolation operation. However, before being provided to the canceller 222 for adaptation, the error signal originally belonging to the first clock domain needs to pass through the digital interpolator 223 to perform the second digital interpolation operation to convert the error signal to the second clock domain.

The digitally synchronized receiving device 20 of FIG. 2 can be extended to the case of the digital received signal containing a plurality of interference signals. For instance, in a 1 Gbps or 10 Gbps Ethernet device such as Ethernet card or Ethernet switch, all four channels simultaneously transceive data in full-duplex manner. The receiver of each channel will receive the echo of the same channel and the near-end cross talk and far-end cross talk of the other three channels, in addition to the data transmitted by the transmitter at the other side of the same channel. The ninth to sixteenth embodiments shown in FIG. 11 to FIG. 18 are eight different implementations of a digitally synchronized receiving device 30 of this invention applied to the 1 Gbps or 10 Gbps Ethernet device. The digitally synchronized receiving device 30 is different from the digitally synchronized receiving device 20 in that a cancellation signal generator 27 of the digitally synchronized receiving device 30 receives a plurality of digital transmitted signals (denoted as $d_1$ to $d_7$) and generates a corresponding plurality of digital cancellation signals. The digital transmitted signal $d_1$ belongs to the second clock domain and contains the data transmitted by the transmitter at the same side of the same channel as the digitally synchronized receiving device 30. The corresponding digital cancellation signal of $d_1$ is a simulated echo. The digital transmitted signals $d_2$ to $d_4$ belong to the second clock domain and respectively contain the data transmitted by the near-end transmitters of the other three channels. The corresponding digital cancellation signals of $d_2$ to $d_4$ are simulated near-end cross talks. The digital transmitted signals $d_5$ to $d_7$ belong to the first clock domain and respectively contain the data transmitted by the far-end transmitters of the other three channels. The corresponding digital cancellation signals of $d_5$ to $d_7$ are simulated far-end cross talks.

Figure 11:
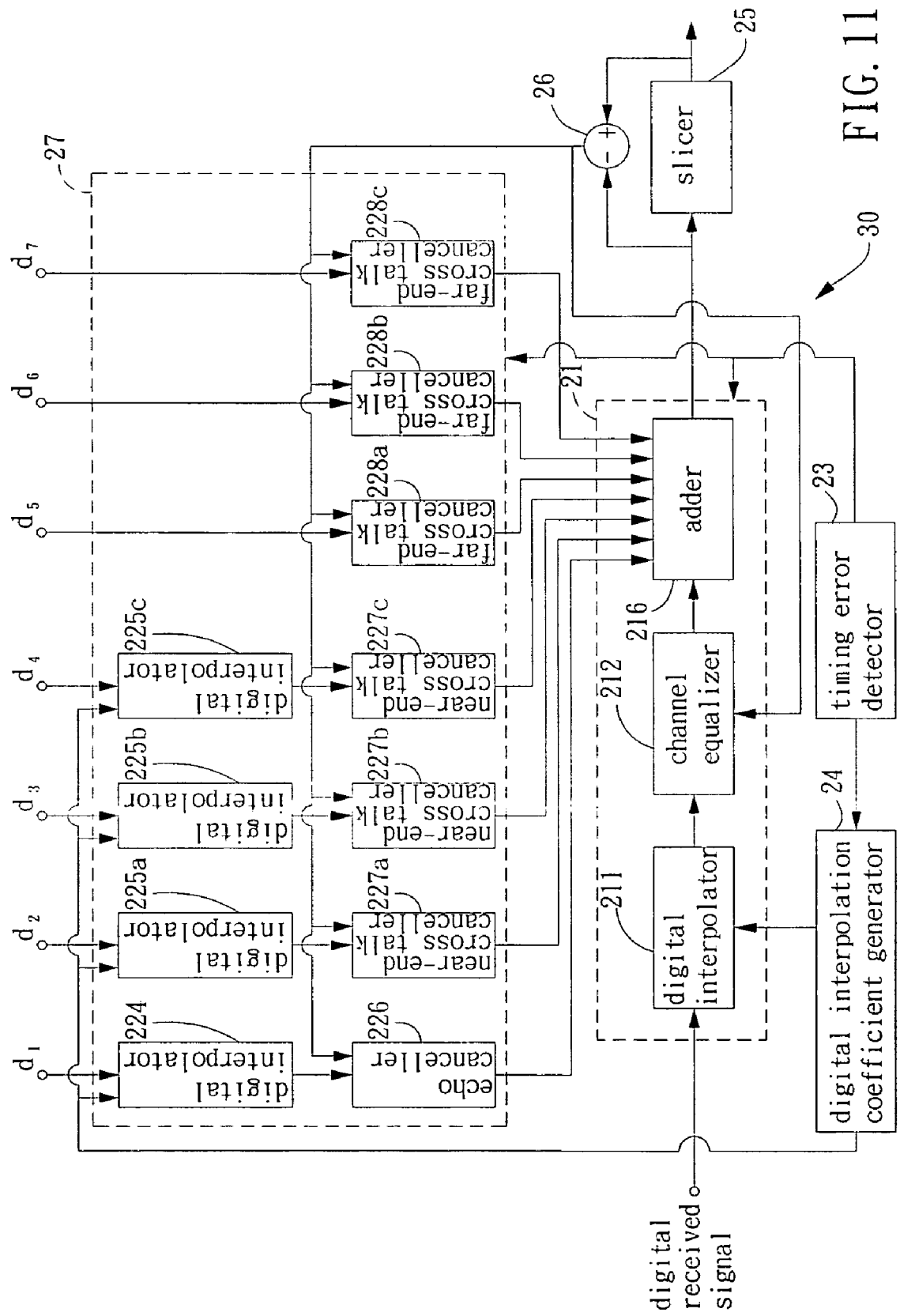
FIG. 11 is a block diagram of the ninth embodiment of the digitally synchronized receiving device of the invention.

In the ninth embodiment of FIG. 11, the cancellation signal generator 27 includes digital interpolators 224, 225a, 225b and 225c which can respectively perform the first digital interpolation operation on $d_1$ to $d_4$ according to the first digital interpolation coefficients generated by the digital interpolation coefficient generator 24 and convert $d_1$ to $d_4$ to the first clock domain. The converted $d_1$ to $d_4$ are then respectively provided to an echo canceller 226 and three near-end cross talk cancellers 227a, 227b and 227c so as to respectively generate the corresponding digital cancellation signal. The echo canceller 226 and the near-end cross talk cancellers 227a, 227b and 227c can also perform the adaptation according to the error signal, thereby generating more accurate digital cancellation signals. The equalizing and canceling circuit 21 of FIG. 11 operates in a similar way as that of FIG. 3, except that the adder 216 subtracts all the seven digital cancellation signals generated by the digital cancellation generator 27 from the digital received signal so as to cancel the echo, near-end cross talks and far-end cross talks.

Figure 12:
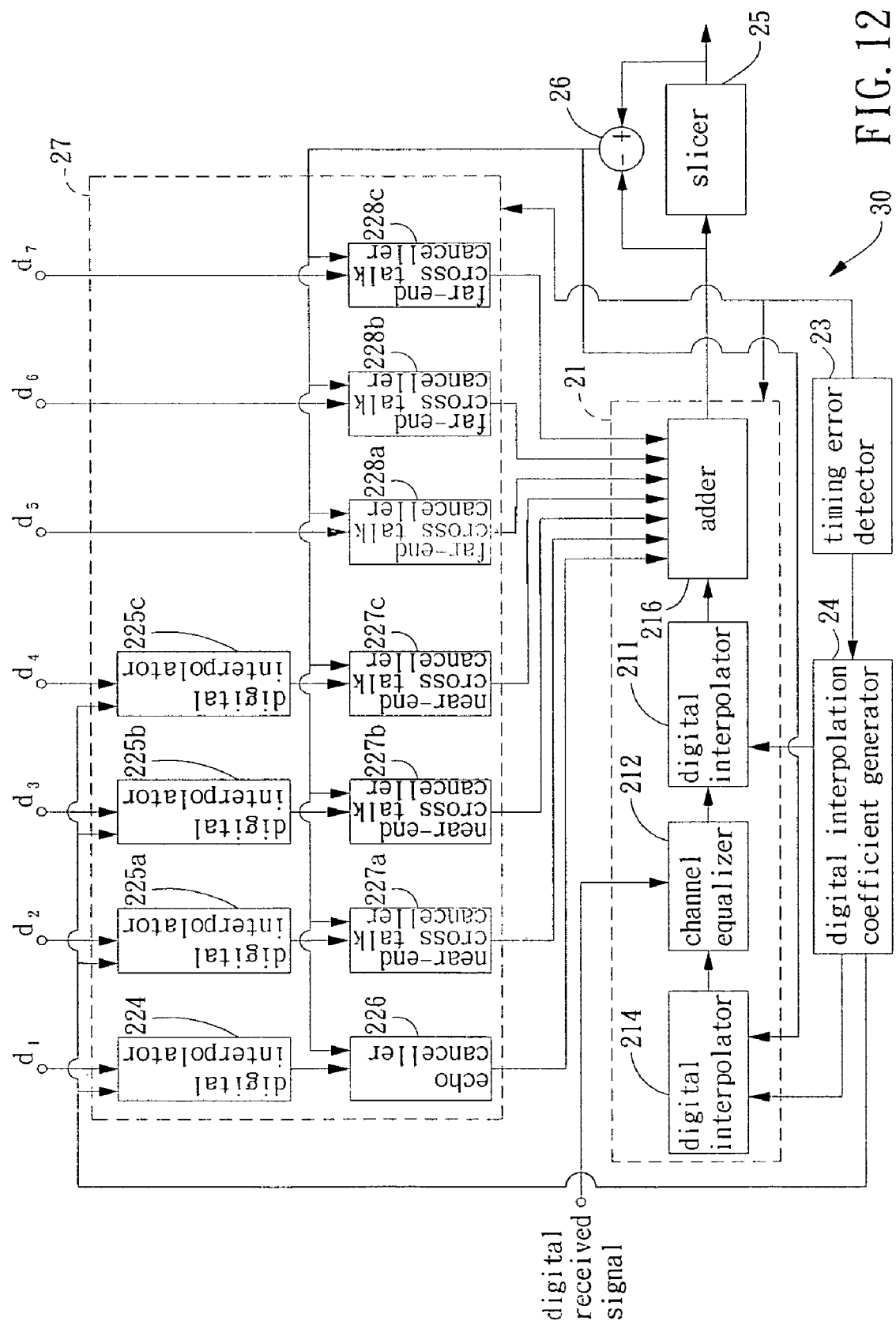
FIG. 12 is a block diagram of the tenth embodiment of the digitally synchronized receiving device of the invention.
Figure 13:
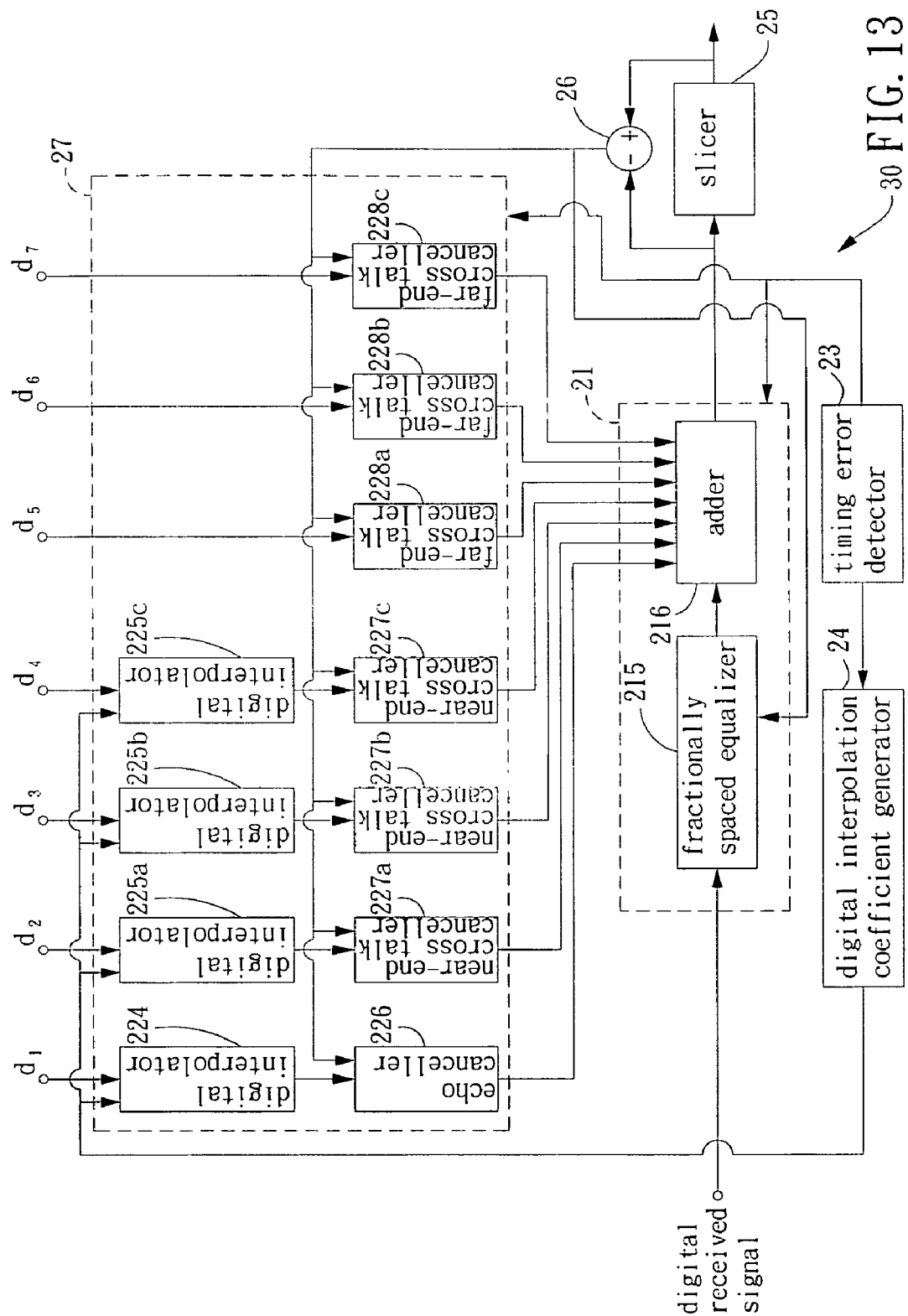
FIG. 13 is a block diagram of the eleventh embodiment of the digitally synchronized receiving device of the invention.

The tenth embodiment of FIG. 12 and the eleventh embodiment of FIG. 13 are similar to the third embodiment of FIG.

5 and the fourth embodiment of FIG. 6 respectively, except that the adder 216 subtracts all the seven digital cancellation signals generated by the digital cancellation generator 27 from the digital received signal.

Figure 14:
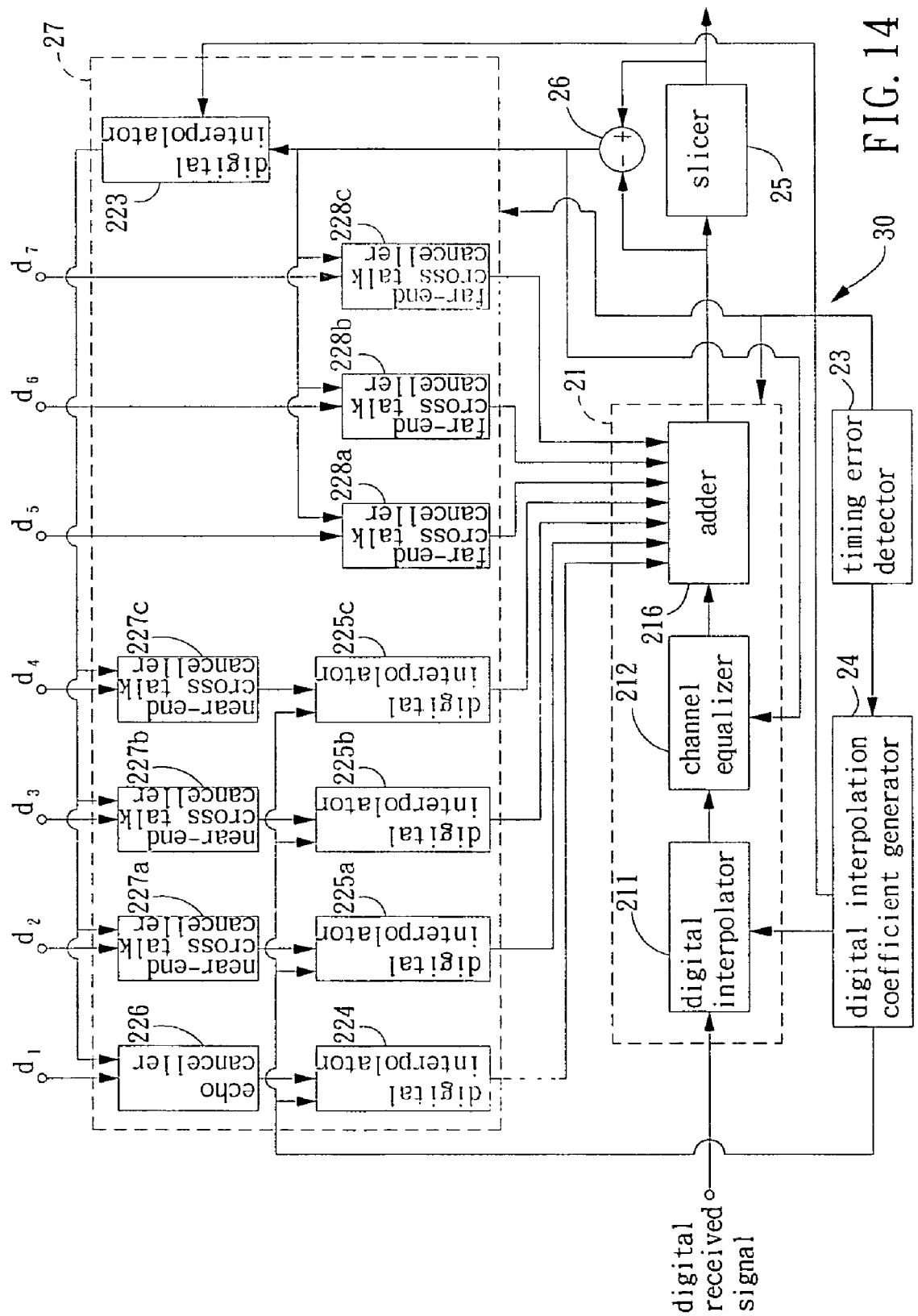
FIG. 14 is a block diagram of the twelfth embodiment of the digitally synchronized receiving device of the invention.

In the twelfth embodiment of FIG. 14, the echo canceller 226 and the near-end cross talk cancellers 227a, 227b and 227c lie before the digital interpolators 224, 225a, 225b and 225c respectively, and generate the corresponding digital cancellation signals according to $d_1$ to $d_4$ respectively. The corresponding digital cancellation signals are then provided to the digital interpolators 224, 225a, 225b and 225c respectively to being converted to the first clock domain. Thus, before being provided to the echo canceller 226 and the near-end cross talk cancellers 227a, 227b and 227c for adaptation, the error signal originally belonging to the first clock domain needs to pass through the digital interpolator 223 to perform the second digital interpolation operation so as to convert the error signal to the second clock domain.

Figure 15:
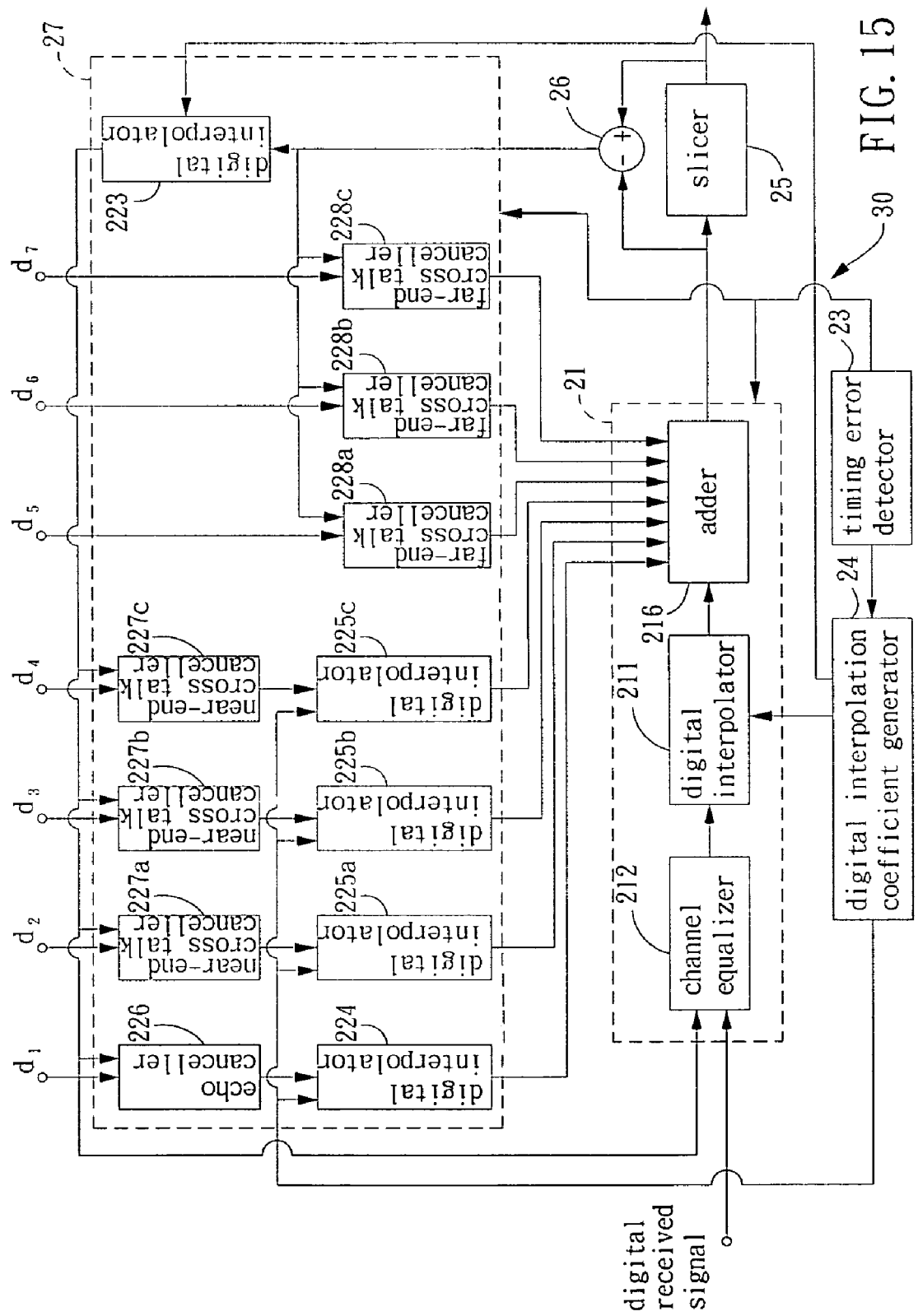
FIG. 15 is a block diagram of the thirteenth embodiment of the digitally synchronized receiving device of the invention.
Figure 16:
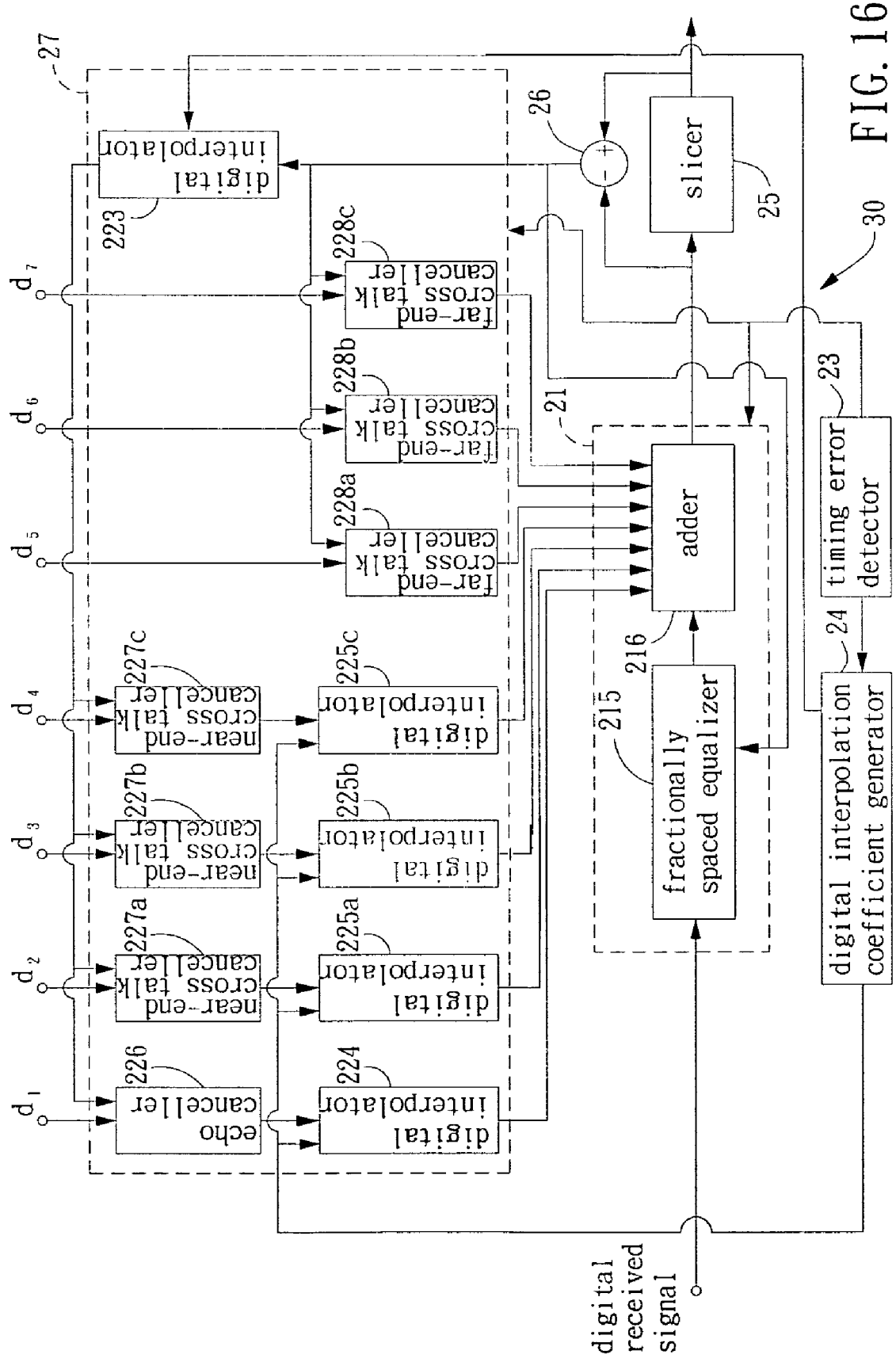
FIG. 16 is a block diagram of the fourteenth embodiment of the digitally synchronized receiving device of the invention.

The equalizing and canceling circuit 21 in the thirteenth embodiment of FIG. 15 and the fourteenth embodiment of FIG. 16 operates in a similar way to that in the sixth embodiment of FIG. 8 and the seventh embodiment of FIG. 9 respectively, except that the adder 216 subtracts all the seven digital cancellation signals generated by the digital cancellation generator 27 from the digital received signal.

In another embodiment, in FIGS. 14~16, the outputs of the echo canceller 226 and the near-end cross talk cancellers 227a, 227b and 227c can be added up by an adder, and the output of the adder is then sent to a digital interpolator before the adder 216. In this manner, the number of the digital interpolator in FIGS. 14~16 can be reduced.

Figure 17:
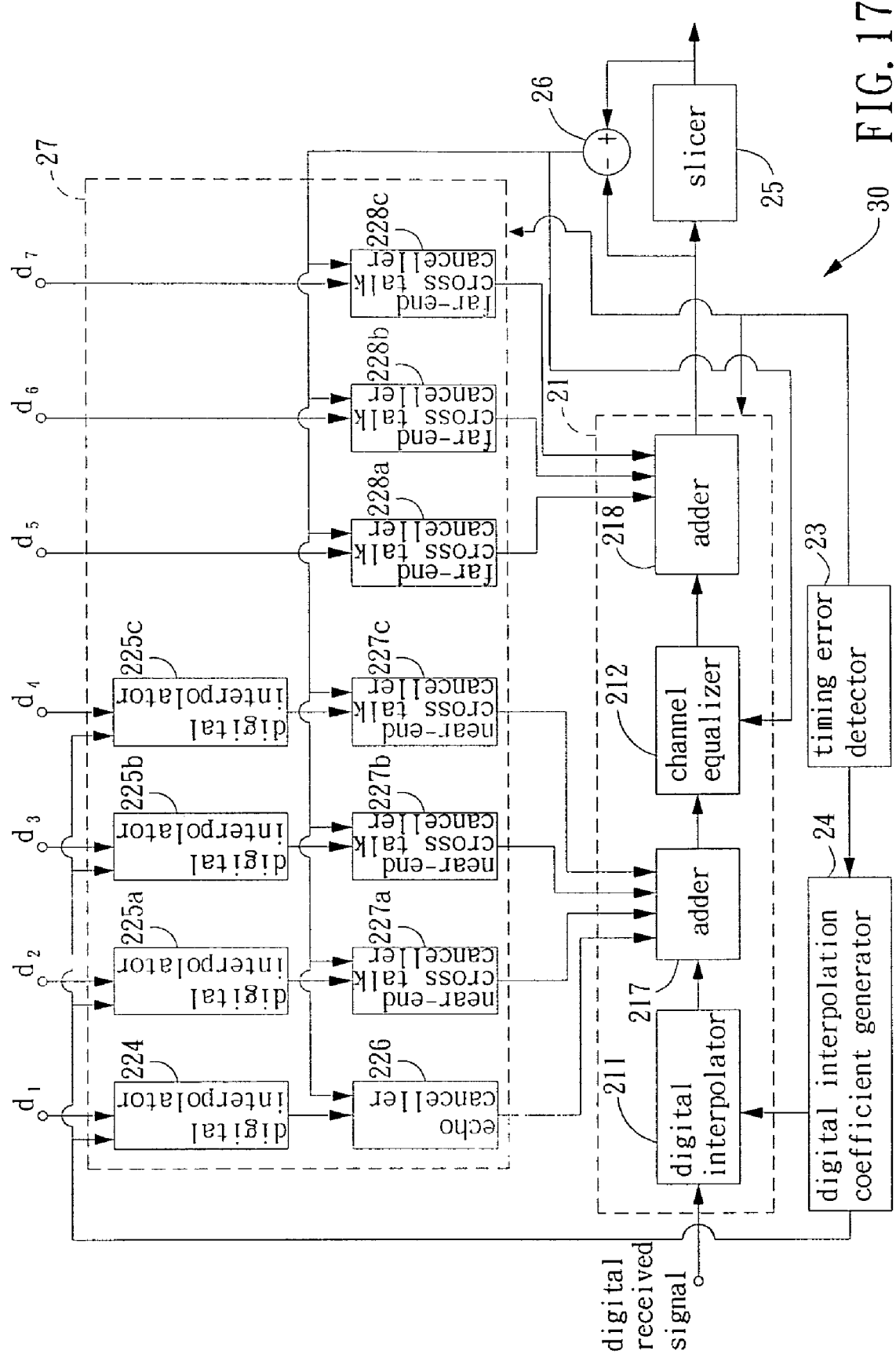
FIG. 17 is a block diagram of the fifteenth embodiment of the digitally synchronized receiving device of the invention.

In the fifteenth embodiment of FIG. 17, the equalizing and canceling circuit 21 uses an adder 217 lying before the channel equalizer 212 to subtract the digital cancellation signals generated by the echo canceller 226 and the near-end cross talk cancellers 227a, 227b and 227c, and uses another adder 218 lying after the channel equalizer 212 to subtract the digital cancellation signals generated by the far-end cross talk cancellers 228a, 228b and 228c.

Figure 18:
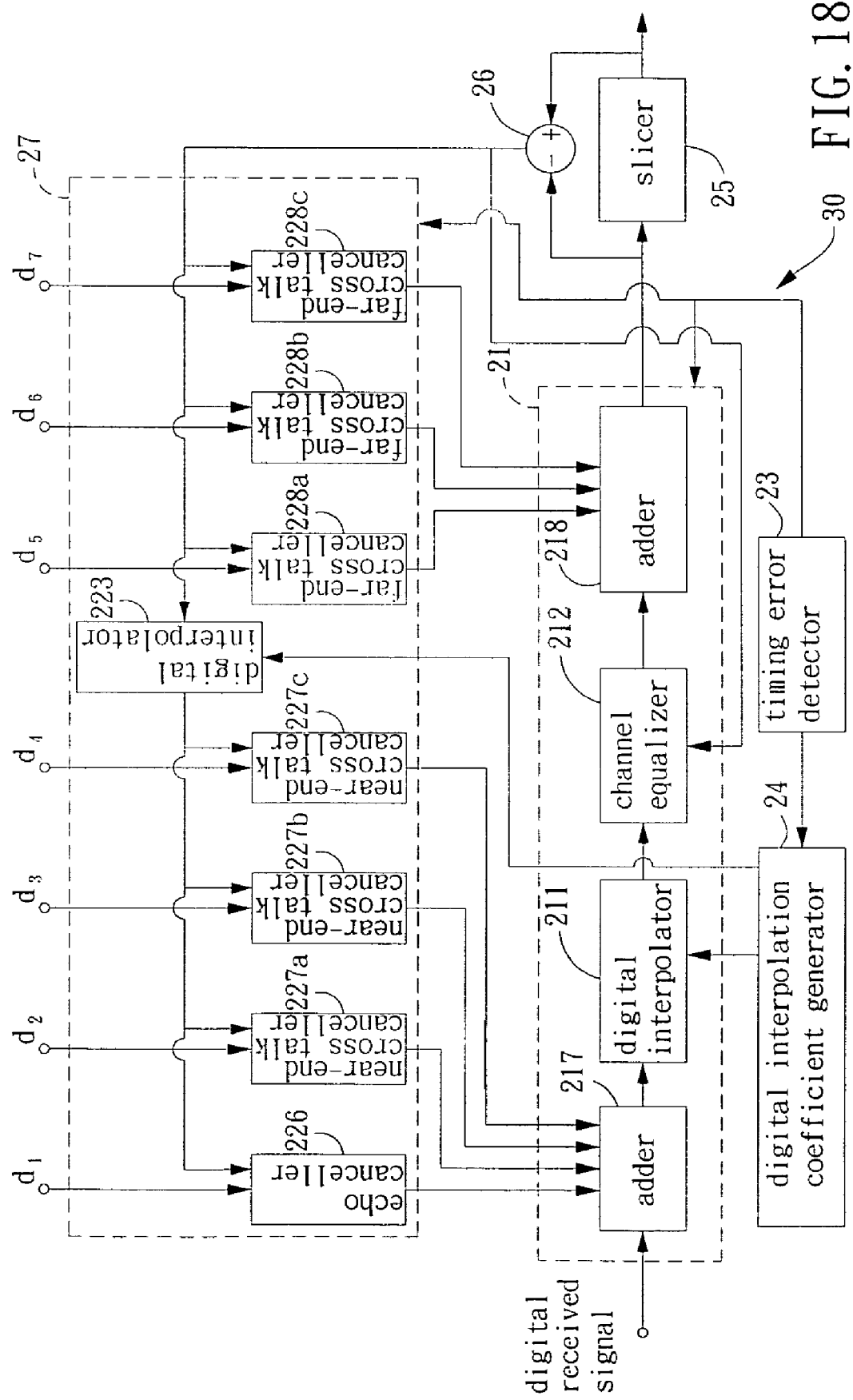
FIG. 18 is a block diagram of the sixteenth embodiment of the digitally synchronized receiving device of the invention.

In the equalizing and canceling circuit 21 of the sixteenth embodiment of FIG. 18, the adder 217 performs the digital interference cancellation before the digital interpolator 211 performing the second-to-first clock domain conversion. That is, when the adder 217 performs the digital interference cancellation, the digital received signal still belongs to the second clock domain. Thus, the digital cancellation signal generator 27 generates the digital cancellation signals directly according to $d_1$ to $d_4$ which originally belong to the second clock domain, without need of the digital interpolators 224, 225a, 225b and 225c to perform the second-to-first clock domain conversion. However, before being provided to the echo canceller 226 and the near-end cross talk cancellers 227a, 227b and 227c for adaptation, the error signal needs to pass through the digital interpolator 223 to perform the second digital interpolation operation so as to convert the error signal to the second clock domain.

In the first to sixteenth embodiments of FIG. 3 to FIG. 18, the equalizing and canceling circuit 21 can further include a channel-shortening filter (not shown in the figures) which can shorten the channel response before performing the channel equalization and digital interference cancellation, thereby enhancing the performance and lowering the complexity of the channel equalization and digital interference cancellation.

Figure 19:
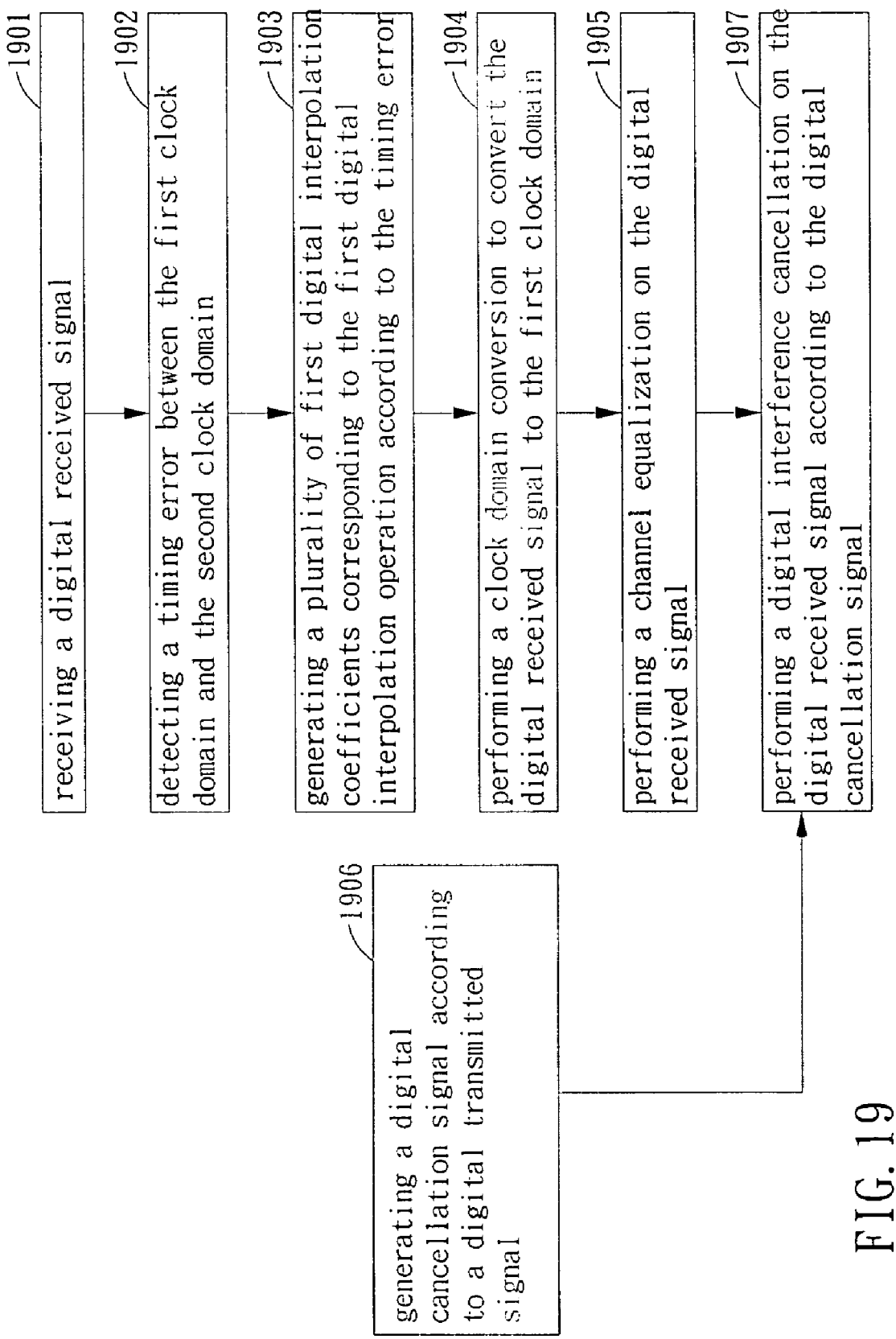
FIG. 19 is a flow chart of the signal processing method used in a receiver according to a preferred embodiment of the invention.

FIG. 19 is a flow chart of the signal processing method used in a receiver according to a preferred embodiment of the invention. Since the related steps of this preferred embodiment have been described in detail as above, the description for these steps is omitted here.

While the present invention has been shown and described with reference to the preferred embodiments thereof and in terms of the illustrative drawings, it should not be considered as limited thereby. Various possible modifications and alterations could be conceived of by one skilled in the art to the form and the content of any particular embodiment, without departing from the scope and the spirit of the present invention.

What is claimed is:

1. A receiving device which operates in a second clock domain and receives data transmitted by a first transmitter operating in a first clock domain, the receiving device comprising:
a cancellation signal generator for generating a digital cancellation signal according to a digital transmitted signal corresponding to data transmitted by a second transmitter, wherein the digital cancellation signal corresponds to an interference signal within a digital received signal of the receiving device, wherein the digital received signal belongs to the second clock domain and corresponds to the data transmitted by the first transmitter, and the interference signal corresponds to the digital transmitted signal; and
an equalizing and canceling circuit, coupled to the cancellation signal generator, for performing a clock domain conversion, a channel equalization, and a digital interference cancellation on the digital received signal according to the digital cancellation signal, wherein the clock domain conversion comprises a digital interpolation operation.

2. The receiving device of claim 1, wherein the equalizing and canceling circuit comprises:
a fractionally spaced equalizer for performing the clock domain conversion and the channel equalization on the digital received signal.

3. The receiving device of claim 1, further comprising:
a timing error detector for detecting a timing error between the first clock domain and the second clock domain; and
a digital interpolation coefficient generator for generating a plurality of digital interpolation coefficients used in the digital interpolation operation according to the timing error.

4. The receiving device of claim 3, wherein the digital interpolation coefficient generator performs Lagrange interpolation algorithm to generate the digital interpolation coefficients.

5. The receiving device of claim 3, wherein the digital transmitted signal belongs to the second clock domain, and the cancellation signal generator comprises:
a digital interpolator for performing the digital interpolation operation on the digital transmitted signal according to the digital interpolation coefficients.

6. The receiving device of claim 1, wherein the interference signal comprises at least one of an echo signal, a near-end cross talk signal and a far-end cross talk signal, and the cancellation signal generator comprises at least one of an echo canceller, a near-end cross talk canceller and a far-end cross talk canceller.

7. The receiving device of claim 1, wherein the equalizing and canceling circuit performs the digital interference cancellation after performing the clock domain conversion and the channel equalization.

8. The receiving device of claim 1, wherein the equalizing and canceling circuit performs the digital interference cancellation after performing the clock domain conversion and before performing the channel equalization.

9. The receiving device of claim 1, wherein the equalizing and canceling circuit performs the digital interference cancellation before performing the clock domain conversion and the channel equalization.

10. The receiving device of claim 3, further comprising:
   a slicer, coupled to the equalizing and canceling circuit, for slicing the processed digital received signal outputted by the equalizing and canceling circuit; and
   a first adder, coupled to the slicer, for calculating a difference between an output of the slicer and the processed digital received signal outputted by the equalizing and canceling circuit to generate an error signal.

11. The receiving device of claim 10, wherein the equalizing and canceling circuit performs the channel equalization according to the error signal.

12. The receiving device of claim 10, wherein the cancellation signal generator generates the digital cancellation signal according to the error signal.

13. A signal processing method used in a receiver which belongs to a second clock domain and receives data transmitted by a first transmitter belonging to a first clock domain, the method comprising:
   receiving a digital received signal, wherein the digital received signal belongs to the second clock domain and corresponds to the data transmitted by the first transmitter;
   generating a digital cancellation signal according to a digital transmitted signal corresponding to data transmitted by a second transmitter, wherein the digital cancellation signal corresponds to an interference signal within the digital received signal, wherein the interference signal corresponds to the digital transmitted signal;
   performing a clock domain conversion to convert the digital received signal to the first clock domain, wherein the clock domain conversion comprises a digital interpolation operation;
   performing a channel equalization on the digital received signal; and
   performing a digital interference cancellation on the digital received signal according to the digital cancellation signal.

14. The method of claim 13, wherein if the digital transmitted signal belongs to the second clock domain and if the step of performing the digital interference cancellation is executed after the step of performing the clock domain conversion, the step of generating the digital cancellation signal comprises performing the clock domain conversion such that the digital cancellation signal belongs to the first clock domain.

15. The method of claim 13, further comprising:
   detecting a timing error between the first clock domain and the second clock domain; and
   generating a plurality of digital interpolation coefficients corresponding to the digital interpolation operation according to the timing error.

16. The method of claim 15, wherein the digital transmitted signal belongs to the second clock domain, and the step of generating the digital cancellation signal comprises:
   performing the digital interpolation operation on the digital transmitted signal according to the digital interpolation coefficients.

17. The method of claim 13, wherein the step of performing the digital interference cancellation is executed after the step of performing the clock domain conversion and the step of performing the channel equalization.

18. The method of claim 13, wherein the step of performing the digital interference cancellation is executed after the step of performing the clock domain conversion and before the step of performing the channel equalization.

19. The method of claim 13, wherein the step of performing the digital interference cancellation is executed before the step of performing the clock domain conversion and the step of performing the channel equalization.

* * * * *